March 31, 1959     R. P. FRASER     2,880,108
METHOD OF MARKING COMPOSITIONS WITH AN INDELIBLE
INK AND COMPOSITION THEREFOR
Filed Feb. 14, 1955

FIG. 1.

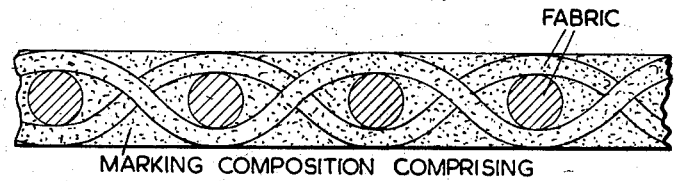

FABRIC

MARKING COMPOSITION COMPRISING

1. FINELY DIVIDED PARTICLES OF CHEMICALLY INERT COLORING MATTER SUCH AS CARBON.
2. FINELY DIVIDED PARTICLES SELECTED FROM THE GROUP CONSISTING OF SULFUR OF A FINENESS SUBSTANTIALLY COMPARABLE TO THAT OF CHEMICALLY PRECIPITATED SULFUR AND SULFUR COMPOUNDS EASILY DISSOCIATED ON HEATING TO A TEMPERATURE ABOVE THE MELTING POINT OF SULFUR TO ELEMENTAL SULFUR.
3. A NON AQUEOUS LIQUID VEHICLE OF LOW EVAPORATION RATE, SUCH AS A MINERAL OIL, PLASTICIZER OR GLYCOL.

FIG. 2.

PLACE IMPREGNATED FABRIC OF FIG. I ON ARTICLE AND TRANSFER MARKING COMPOSITION TO ARTICLE BY IMPRESSION THROUGH FABRIC.

APPLY HEAT AS BY IRONING, TO MARKED ARTICLE AT A TEMPERATURE SLIGHTLY HIGHER THAN THE MELTING POINT OF SULFUR TO MAKE THE MARKING RESISTANT TO ERASION, TO MANY HOURS OF BOILING IN A HIGH CONCENTRATION OF SOAP SOLUTION WHICH MAY CONTAIN A FREE ALKALI, AND TO BOILING DETERGENT SOLUTIONS WHICH MAY CONTAIN A BLEACHING AGENT.

*Inventor*

REGINALD PERCY FRASER

By Corey, Hart & Stemple

*Attorneys*

2,880,108

METHOD OF MARKING COMPOSITIONS WITH AN INDELIBLE INK AND COMPOSITION THEREFOR

Reginald Percy Fraser, Kingston Hill, England

Application February 14, 1955, Serial No. 488,109

Claims priority, application Great Britain February 17, 1954

9 Claims. (Cl. 117—1)

This invention relates to marking compositions and has for its object to provide a novel composition that will remain indelible notwithstanding submission to bleaching and washing preparations employed in subsequent cleansing operations. In particular the improved marking composition is adapted for use in laundries in which customers' identification symbols are marked upon the articles to be laundered or upon tabs or labels applied thereto.

A further object is to provide a marking composition of the kind above stated and suitable for impregnating a ribbon or screen from which the ink can be offset by the pressure of a type key, or stamp or pencil.

In the drawing,

Fig. 1 is a diagrammatic cross-sectional view, much enlarged, of a portion of fabric impregnated with the fluid marking ink composition of the present invention, and Fig. 2 is a flow diagram illustrating the process of applying the marking composition to a laundry article in accordance with the present invention.

Although the new composition is particularly intended for use in marking fabrics such as wearing apparel it may also be used for marking paper, cardboard and the like.

A marking composition for the purpose in view must be indelible or capable of being easily rendered indelible, it must also be unbleachable and insensitive to the usual cleansing compositions used in laundries and it must possess a pronounced density of coloration. The indelible character of the composition may be developed by a subsequent heating operation such as ironing. In the case of application to fabrics such as constitute articles of wearing apparel, the fixation may be a chemical or mechanical bonding of the composition to the fibres of the articles.

Hitherto indelible inks suitable for the purpose have been of the type containing silver or aniline chloride. Typical inks containing silver contain a quantity of silver nitrate in association with an alkali such as sodium carbonate and a gum, and sometimes a small quantity of carbon, with a water solution of a gum as the liquid vehicle. Such inks are usually supplied in two solutions which require to be mixed prior to use.

A typical ink containing aniline chloride is one having a copper salt such as sulphate or chloride associated with the aniline chloride in a liquid vehicle consisting of water, glycerine, gum arabic or dextrin.

It has also been proposed to make indelible inks by the use of types of pitch such as stearine pitch or resin pitch in an oil vehicle, and even solutions of gutta percha have been tried.

Satisfactory indelibility in the marking of laundry articles may be described by stating that the marking should resist many hours of boiling in a high concentration of soap solution which may also contain a considerable amount of free alkali in the form of sodium carbonate. It must also resist a good deal of flexing of the fabric and even rubbing or abrasion.

Assuming an ink is chemicaly suitable in all respects and cannot be attacked by alkalies, detergents or soaps, then the limit of indelibility is reached when the fabric itself starts to disintegrate and actual destruction occurs of the fibers carrying the colour of the ink.

The colour of an indelible ink most commonly employed is, of course, black but reds and other colours can be prepared by this invention.

It will be understood that to satisfy the above requirements dyes or dye pigments are not likely to be satisfactory and completely inert colouring matter must be employed.

According to the present invention a non-aqueous substantially non-volatile liquid composition is provided consisting essentially of finely divided carbon and/or one or more water insoluble compounds of a metal or metals such as a suitable metal oxide commonly known as a colouring oxide intimately admixed with sulphur either initially present as such or released from a sulphur compound easily dissociated to release sulphur as by heat or water or a laundering liquid. The sulphur is preferably in the form of precipitated sulphur and with or without a synthetic resin having a melting point below that of sulphur. These constituents are moistened with a suitable wetting agent and are suspended in a liquid vehicle of low evaporation rate. Suitable liquid vehicles are mineral oils, plasticizers and glycols.

The new composition may be applied to a fabric screen or to a marking ribbon of fabric so as to be usable in laundry marking machines in which marking ribbons or the like are incorporated.

When the ink of the novel composition above described is held absorbed in a fabric such as a ribbon or screen and the desired marking is effected by transfer through the fabric to an article placed beneath it, the marking is transferred to the article and is rendered indelible by heating to a temperature slightly higher than the melting point of sulphur. The heat may be applied in any suitable way as by ironing or by passage between heated rollers or the pressure of a heated platen. The effect of the heat is to melt the sulphur, or the sulphur and resin, to low viscosity and to bond the colouring matter to the fabric on cooling.

Sulphur is unique in this respect in that, at an appreciably higher temperature than its melting point, its viscosity rises and does not fall. Thus an excessively hot platen will not cause the ink to flow through the fabric and become lost by transfer onto the surface of the said platen. Furthermore, the sulphur, which acts as the bonding agent between the colouring matter and the fabric fibers, is highly inert chemically and is unaffected by soaps, detergents or bleaching agents.

The following are examples of marking ink compositions compounded in accordance with the invention:

Example I

|   | Parts by weight |
|---|---|
| Finely divided carbon | 1.5 |
| Precipitated sulphur | 8 |
| Ground and suspended in a liquid vehicle of olein of 240° C. B.P. | 4 |

Example II

|   |   |
|---|---|
| Finely divided carbon | 1 |
| Precipitated sulphur | 8 |
| Ground and suspended in a liquid vehicle of ditolyl phosphate | 4.8 |

Example III

| | |
|---|---|
| Finely divided carbon | 8 |
| Precipitated lead thiocyanate | 5.5 |
| Ground and suspended in a liquid vehicle of polyethylene glycol | 30 |

Example IV

| | |
|---|---|
| Finely divided carbon | 1 |
| Precipitated sulphur | 4 |
| Aroclor 5460 (Monsanto) | 2 |
| Ground and suspended in a liquid vehicle of Aroclor 1248 of distillation range 340°–375° C. | 7.5 |

Example V

| | |
|---|---|
| Finely divided rouge (as colouring) | 4 |
| Precipitated sulphur | 2 |
| Ground and suspended in a liquid vehicle of dibutyl phthalate | 8 |

Cadmium red, titanium oxide or ultramarine may be substituted for the rouge.

Suitable wetting agents for carbon may be added, such as gilsonite or copper oleate, representing less than 5% of the weight of the liquid vehicle. As a suitable wetting agent for the colouring oxide lecithin may be used.

What I claim is:

1. A non-aqueous, hydrophobic substantially non-volatile, fluid marking ink composition capable of impregnating a fabric from which it can be offset by pressure onto an article and of forming on the article under the application of heat an indelible flexible mark which is resistant to erasion, to many hours of boiling in a high concentration of soap solution which may contain a free alkali, and to boiling detergent solutions which may contain a bleaching agent, said composition comprising essentially finely divided chemically inert coloring matter, finely divided sulfur of a fineness substantially comparable to that of chemically precipitated sulfur, and a non-aqueous liquid vehicle of low evaporation rate in which the said coloring matter and sulfur are intimately dispersed, the weight of said coloring matter being substantially less than the weight of said liquid vehicle and less than one-half the combined weight of said liquid vehicle and said sulfur.

2. A non-aqueous, hydrophobic, substantially non-volatile, fluid marking ink composition capable of impregnating a fabric from which it can be offset by pressure onto an article and of forming on the article upon the application of heat an indelible flexible mark which is resistant to erasion, to many hours of boiling in a high concentration of soap solution which may contain a free alkali, and to boiling detergent solutions which may contain a bleaching agent, said composition comprising essentially a non-aqueous liquid vehicle of low evaporation rate, finely divided particles of chemically inert coloring matter, and finely divided particles selected from the group consisting of sulfur of a fineness substantially comparable to that of chemically precipitated sulfur and sulfur compounds easily dissociated on heating to a temperature above the melting point of sulfur to elemental sulfur, the weight of said coloring matter being substantially less than the weight of said liquid vehicle and less than one-half the combined weight of said liquid vehicle and said sulfur, the particles of coloring matter and sulfur or sulfur compound being suspended in and intimately dispersed throughout said liquid vehicle and the composition being capable of retaining its liquid character until subjected to said heat, said sulfur initially present or liberated on heating being capable of bonding the intimately dispersed particles of finely divided coloring matter to the structure of the article by said application of heat.

3. A marking ink composition according to claim 2 in which the sulphur is precipitated sulphur.

4. A marking ink composition according to claim 2 in which the sulphur is in the form of an easily dissociated sulphur compound yielding elemental sulphur.

5. A marking ink composition according to claim 2 in which the sulphur is in the form of lead thiocyanate.

6. A marking ink composition according to claim 2 including also a wetting agent.

7. A method of marking an article with an indelible flexible mark which is resistant to erasion, to many hours of boiling in a high concentration of soap solution which may contain a free alkali, and to boiling detergent solutions which may contain a bleaching agent, comprising the steps of applying the mark to the article with a non-aqueous, hydrophobic, substantially non-volatile fluid marking ink composition capable of impregnating a fabric from which it can be offset by pressure onto the article and containing finely divided particles of chemically inert coloring matter, finely divided particles selected from the group consisting of sulfur of a fineness substantially comparable to that of chemically precipitated sulfur and sulfur compounds easily dissociated on heating to a temperature above the melting point of sulfur to elemental sulfur, and a non-aqueous liquid vehicle of low evaporation rate in which the particles of coloring matter and sulfur or sulfur compound are intimately dispersed, the weight of said coloring matter in the composition being less than the weight of said liquid vehicle and less than one-half the combined weight of the liquid vehicle and the sulfur, and then rendering the mark indelible to the degree aforesaid by subjecting the applied composition forming such marking to a temperature slightly higher than the melting point of sulfur and such as to cause the sulfur to attain a condition of substantially maximum fluidity and thereby enable it to readily flow into the structure of the article and to bond the finely divided particles of coloring matter in such composition to the structure of the article.

8. A method of marking an article with an indelible flexible mark which is resistant to erasion, to many hours of boiling in a high concentration of soap solution which may contain a free alkali, and to boiling detergent solutions which may contain a bleaching agent, comprising the steps of applying the mark to the article with a non-aqueous, hydrophobic, substantially non-volatile fluid marking ink composition capable of impregnating a fabric from which it can be offset by pressure onto the article and containing finely divided particles of chemically inert coloring matter, finely divided particles selected from the group consisting of sulfur of a fineness substantially comparable to that of chemically precipitated sulfur and sulfur compounds easily dissociated on heating to a temperature above the melting point of sulfur to elemental sulfur, and a non-aqueous liquid vehicle of low evaporation rate in which the particles of coloring matter and sulfur or sulfur compound are intimately dispersed, the weight of said coloring matter in the composition being less than the weight of said liquid vehicle and less than one-half the combined weight of the liquid vehicle and the sulfur, and then rendering the mark indelible to the degree aforesaid by subjecting the applied composition forming such marking to a temperature slightly higher than the melting point of sulfur while applying pressure thereto, the applied heat being such as to cause the sulfur to attain a condition of substantially maximum fluidity and thereby enable it to flow readily into the structure of the article without substantial loss by transfer to the device applying the pressure, and the coaction of such heat and pressure being such as to cause the fluid sulfur penetrating the article to bond the finely divided particles of coloring matter therein to the structure of the article.

9. An article of manufacture comprising a fabric carrying medium having in permeating physical association therewith a non-aqueous, hydrophobic, substantially non-volatile fluid marking ink composition capable of impregnating said fabric medium and of being offset therefrom by pressure onto an article and comprising essentially finely divided particles of chemically inert coloring matter, finely divided particles selected from the group consisting of sulfur of a fineness substantially comparable to that of chemically precipitated sulfur and sulfur compounds easily dissociated on heating to a temperature above the melting point of sulfur to elemental sulfur, and a non-aqueous liquid vehicle of low evaporation rate in which the particles of said coloring matter and sulfur or sulfur compound are suspended and intimately dispersed throughout, the weight of said coloring matter being substantially less than the weight of said liquid vehicle and less than one-half the combined weight of said liquid vehicle and said sulfur, and said composition when transferred in liquid form from said carrying medium to an article and subjected to a temperature slightly higher than the melting point of sulfur while applying pressure thereto, being capable of forming on such article an indelible flexible mark, the sulfur under such applied heat and pressure attaining a condition of substantially maximum fluidity enabling it to flow readily into the structure of the article without substantial loss by transfer to the device applying the pressure and bonding the particles of coloring matter to the structure of the article so as to provide an indelible mark which is resistant to erasion, to many hours of boiling in a high concentration of soap solution which may contain a free alkali, and to boiling detergent solutions which may contain a bleaching agent.

References Cited in the file of this patent

UNITED STATES PATENTS

| | | |
|---|---|---|
| 266,053 | Sachs | Oct. 17, 1882 |
| 911,594 | Kaye | Feb. 9, 1909 |
| 1,730,178 | Van Cuyck | Oct. 1, 1929 |
| 2,036,471 | Gill | Apr. 7, 1936 |
| 2,790,736 | McLaughlin | Apr. 30, 1957 |

FOREIGN PATENTS

| | | |
|---|---|---|
| 509,846 | France | Nov. 20, 1920 |